Patented Aug. 30, 1932

1,874,895

UNITED STATES PATENT OFFICE

WILLIAM S. CALCOTT AND WILLIAM A. DOUGLASS, OF PENNSGROVE, NEW JERSEY, ASSIGNORS TO E. I. DU PONT DE NEMOURS & COMPANY, OF WILMINGTON, DELAWARE, A CORPORATION OF DELAWARE

ANTIOXIDANT FOR RUBBER

No Drawing. Application filed August 13, 1929. Serial No. 385,688.

This invention relates to a method of treating rubber for imparting age-resisting qualities thereto and to the resulting rubber products. More particularly, it is concerned with the incorporation with rubber of certain types of compounds formed by the reaction of aliphatic aldehydes on aromatic primary amines at low temperatures.

It is generally accepted that the rate of deterioration of rubber articles differs greatly depending upon various factors among the most important of which is the composition of the stock. Various materials have heretofore been incorporated in rubber stocks to inhibit deterioration, including condensation products of aldehydes with amines. However, most of these agents, and among them the previously employed aldehyde-amine condensates have been open to the objection that they cause discoloration of the rubber, especially upon exposure to direct sunlight.

The primary object of this invention, therefore, is to provide a method for retarding the deterioration of rubber by the use of materials which cause practically no subsequent discoloration even upon exposure to direct sunlight.

With this object in view we have discovered the adaptability for use as antioxidants of a class of compounds not hitherto employed for this purpose. Although the new antioxidants are obtained by the condensation of aliphatic aldehydes with aromatic amines, they are obtained under peculiar conditions and exhibit properties quite different from those products previously employed with rubber and prepared from these compounds at high temperatures.

The method employed in the preparation of these compounds is described in Berichte, Vol. 25, page 2030, and consists in reacting equal molecular proportions of an aliphatic aldehyde, as acetaldehyde, and a primary aromatic amine, as aniline, in the presence of a solvent as, for example, alcohol, and at temperatures below 10° C. and preferably below 5° C. The antioxidants so prepared cause much less discoloration, on exposure of the vulcanized rubber containing them to light, than do the antioxidants previously proposed and are particularly valuable in imparting to the rubber heat resisting qualities.

As an illustration of the preparation of this type of compound, the following example is furnished:

Example 1

372 g. (4 g. moles) aniline and 372 cc. of alcohol are mixed and cooled to 0° C. A mixture of 144 g. (100%) acetaldehyde (4 g. moles) and 100 cc. alcohol are gradually added with efficient agitation and cooling at such a rate that the temperature does not rise above 5° C. The time of the reaction depends mainly on the efficiency of the cooling and may require from 30 minutes to 2 hours. It is advantageous to precool the mixture of aldehyde and alcohol although this is not necessary.

Agitation is continued maintaining the temperature below 5° C. for at least 1 hour as the addition of the aldehyde is complete. During this time white crystals begin to separate. These crystals, which are the desired product, are filtered off and dried. The melting point range of material prepared in this manner has been found to be 121–122° C.

This product is apparently formed by the reaction of 2 molecules of amine and 2 molecules of aldehyde and is believed to be a stereo isomer. It has been assigned the following formula (Leibig's Ann. v. 318, page 69):

Anilido butylidene aniline

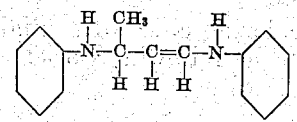

According to the above it has the empirical formula $C_{16}H_{18}N_2$ and therefore a theoretical nitrogen content of 11.7%. A Kjeldahl nitrogen determination, however, showed only 10.2%, which corresponds to a purity of only 85%.

We, therefore, do not wish to limit ourselves to the formulas or mechanism of the reaction outlined herein, inasmuch as the products of the reaction, although quite possibly containing a compound of the type indicated above, are evidently of indefinite constitution.

In order to make clear the advantages of compounds of the type described when employed in rubber, the following examples illustrating their effectiveness as deterioration inhibitors are presented. It should be understood, however, that these examples are furnished purely by way of illustration and that it is not the intention that the invention be limited to the particular antioxidant proportions or other conditions therein specified.

*Example 2*

The antioxidant properties of the product obtained by the method disclosed in Example 1 are indicated by the following tests made upon a stock of the composition:

|  | Parts |
|---|---|
| Smoked sheets | 100 |
| Zinc oxide | 18.15 |
| Sulfur | 2.75 |
| Di-o-tolylguanidine | 0.5625 |

This stock was divided into three parts. In one part 2.5% of anilido butylidine aniline was incorporated and in another part 5% of the same compound was incorporated. The third part was untreated. The three stocks were then cured for 45 minutes at 40 lbs. steam pressure and the cured stocks exposed in an oven at 90° C. Daily tests of the tensile strength gave the following results:

| Days in oven at 90° C. | Tensile strength | | | | | |
|---|---|---|---|---|---|---|
|  | 0 | 1 | 2 | 4 | 6 | 8 |
| No antioxidant | 3175 | 3175 | 1250 | 1000 | 275 | 150 |
| 2.5 per cent antioxidant | 3100 | 3525 | 2125 | 2025 | 1075 | 625 |
| 5.0 per cent antioxidant | 3200 | 3675 | 2725 | 2450 | 2000 | 1050 |

The same stock was aged in the bomb at 70° C. under 300 lbs. oxygen pressure. In five days the control was completely deteriorated, the sample containing 2.5% antioxidant in 20 days, and the sample containing 5% in 24 days.

*Example 3*

The discoloring effect of sunlight was determined in the following stock:

|  | Parts |
|---|---|
| Pale crepe | 100 |
| Zinc oxide | 3 |
| Titanox | 50 |
| Sulfur | 2.75 |
| Tetramethyl-thiuram-monosulfide | 0.2 |

Cure 20 minutes at 20 lbs. steam pressure. Samples containing 1% each of the following antioxidants were exposed to direct sunlight under glass for 7 days. The amount of discoloration was measured by means of the Lovibond tintometer. The values reported are units of total color on the Lovibond scale.

| Antioxidant | Total color |
|---|---|
| Anilido butylidene aniline | 6.5 |
| Diphenyl ethylene diamine | 7.7 |
| Acetaldehyde aniline acid condensate | 13.7 |
| Neozone (phenyl-a-naphthylamine+m-toluylene-diamine) | 31.3 |

The Titanox, listed in the above formula, is a mixture of approximately 75% barium sulfate and 25% titanium oxide.

The above results clearly establish the peculiar value of this compound when employed as an antioxidant in light colored stocks.

In addition to the compound mentioned above, other products which are obtained by the reaction at low temperatures of the homologues of acetaldehyde, such as propyl aldehyde, heptaldehyde, butyraldehyde, etc., and other primary aryl amines such as, for example, o-toluidine, o-anisidine, p-phenetidine, and the xylidines, may be employed. The compounds indicated below may be mentioned as among those tested and found to have antioxidant and discoloring properties comparable to anilido butylidene aniline. According to the prior literature they may be indicated as follows:

*Anilido hexylidene aniline*

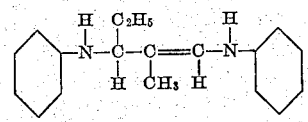

*Anilido octalidene aniline*

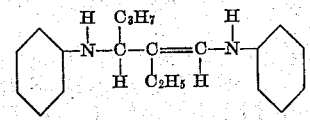

*o-Toluidido butylidene aniline*

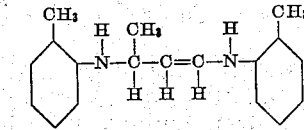

It will be noted that the aliphatic aldehydes employed in the preparation of the above compounds all contain at least two carbon atoms since it has been found that, by reason of the abnormal behavior of formaldehyde, the products so obtained are not well adapted for use. Of the compounds mentioned, that obtained from aniline and butyraldehyde, because of its marked preserving properties, represents our preferred embodiment.

According to the formulas which, as noted above, have been already assigned these products in the literature, they have the general formula:

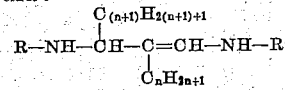

where R and R' represent aryl nuclei.

Many other compounds of the type listed above could be named. Moreover it is obvious that compounds of the type described may contain non-polar substituents in the aromatic nuclei which substituents would have very little effect upon the properties of the compounds containing the same.

The new antioxidants may be incorporated into the rubber by any well known means, such as by milling them into the stock upon the rolls of an ordinary mill prior to vulcanization. In the above examples they were so incorporated. However, it is often advantageous to treat vulcanized rubber with reagents to improve its aging properties. This group of antioxidants is particularly useful for this purpose and may be incorporated with the vulcanized rubber by immersing the latter in a solution of the anti-oxidant. Treatment of vulcanized rubber with vapors of compounds of this class will also improve the aging characteristics.

Moreover, the antioxidants may be employed in various rubber compounds and rubber substitutes such as, for example, guttapercha, balata and synthetic rubber. It is therefore to be understood that the invention is not limited to any particular rubber stock or rubber compound.

Also the proportions of the antioxidant employed may be varied within wide limits although under ordinary circumstances from 1 to 5% of the antioxidant based on the weight of the rubber content of the stock treated and, depending upon the protection desired and the conditions of exposure to be met, has been found to be highly satisfactory.

As many apparent and widely different embodiments of this invention may be made without departing from the spirit thereof, it is to be understood that we do not limit ourselves to the foregoing examples or description except as indicated in the following claims.

We claim:

1. The process of increasing the resistance of rubber to deterioration which comprises incorporating with the rubber a compound obtained by reacting substantially equal molecular proportions of butyraldehyde and a primary aromatic amine at temperatures not substantially in excess of 5° C.

2. Vulcanized rubber obtained by incorporating with rubber, prior to vulcanizing, a vulcanizing agent and an antioxidant obtained by reacting substantially equal molecular proportions of butyraldehyde and a primary aromatic amine at temperatures not substantially in excess of 5° C.

3. The process of increasing the resistance of rubber to deterioration, which comprises incorporating with the rubber a compound obtained by reacting substantially equal molecular proportions of butyraldehyde and aniline at temperatures not substantially in excess of 5° C.

4. Vulcanized rubber obtained by incorporating with rubber prior to vulcanizing a vulcanizing agent and an antioxidant obtained by reacting substantially equal molecular proportions of butyraldehyde and aniline at temperatures not substantially in excess of 5° C.

In testimony whereof we affix our signatures.

WILLIAM S. CALCOTT.
WILLIAM A. DOUGLASS.